Patented Mar. 27, 1934

1,952,166

UNITED STATES PATENT OFFICE 1,952,166

MERCURY DERIVATIVES OF SUBSTITUTION PRODUCTS OF DI-PHENYL PHENOL-PHTHALEIN

Sidney E. Harris, Brooklyn, N. Y., and Walter G. Christiansen, Bloomfield, N. J., assignors to E. R. Squibb & Sons, Brooklyn, N. Y., a corporation of New York No Drawing. Application May 23, 1931, Serial No. 539,633

8 Claims. (Cl. 260—13)

This invention relates to mercury derivatives of di-phenyl phenol phthalein and its substitution products.

In a co-pending application Ser. No. 539,632 filed May 23, 1931, we have described di-phenyl phenol phthalein and various derivatives thereof. These compounds have the general formula

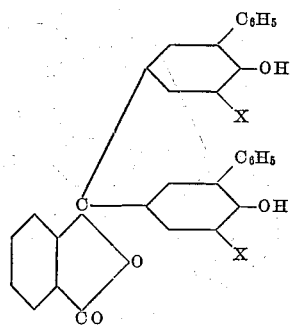

in which X is a monovalent substituent, especially hydrogen, a halogen, nitro, amino, or an alkyl.

The mercury derivatives are believed to have the general structure I or II:

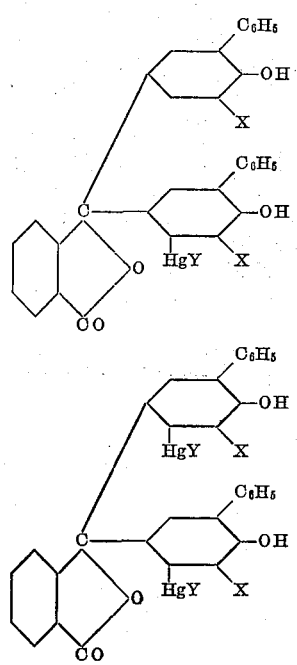

in which X is as in the general formula for di-phenyl phenol phthalein and its derivatives and Y may be hydroxyl, a halogen or other monovalent radical. It is not certain that the mercury enters in exactly the position indicated by the formulæ and it is not our intention to limit the invention to these exact compositions. Mercury derivatives of di-phenyl phenol phthalein and its substitution products are novel, regardless of the position in which the mercury is found, and as such are a part of our invention.

The preparation of the products is illustrated in the following examples:

*Example I.—Mono mercury compound of di-bromo di-phenyl phenol phthalein*

6.3 gms. of dibromo diphenyl phenolphthalein are dissolved in 75 ccs. of alcohol and heated to boiling. To the vigorously agitated boiling solution a solution of 3 gms. mercuric acetate in 20 ccs. water containing a small quantity say 0.1 ccs. of glacial acetic acid is added in a slow stream. The mixture is then boiled until inorganic mercury ions can no longer be detected in the liquid phase. The hot mixture is filtered and the precipitate washed thoroughly with alcohol and ether and finally dried in vacuo.

The product is a sandy amorphous powder, insoluble in water and the common organic solvents, but readily soluble in dilute alkali solutions including ammonium hydroxide.

*Example II.—Di-mercury derivative of dinitro diphenyl phenol phthalein*

3 gms. of dinitro diphenyl phenol phthalein are dissolved in 60 ccs. of alcohol and heated to boiling. To the well agitated boiling solution is added a solution of 6.8 gms. of mercuric acetate in 20 ccs. of water to which has been added a small quantity say 0.1 ccs. of glacial acetic acid. The mixture is boiled with agitation till mercuric ions can no longer be detected in the liquid. The liquid is then allowed to cool and the precipitated dimercurated dinitro diphenyl phenol phthalein is filtered off, washed with water, alcohol and ether and dried in vacuo. The product is a yellow powder insoluble in common organic solvents but readily soluble in dilute alkalies.

The novel compounds herein described are adapted for use as bactericidal agents and for other purposes.

We claim:

1. The compound formed by boiling a solution of a di-phenyl phenol phthalein with mercuric acetate and a small amount of glacial acetic acid.

2. The mono- and di-mercury derivatives of a compound represented by the formula:

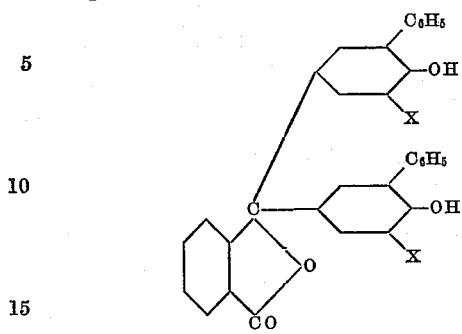

in which X is a monovalent substituent, said derivatives containing mercury in the position it occupies when solutions of said compounds in inert organic solvents are boiled with mercuric acetate and a small amount of glacial acetic acid.

3. The mono- and di-mercury derivatives of a compound represented by the formula:

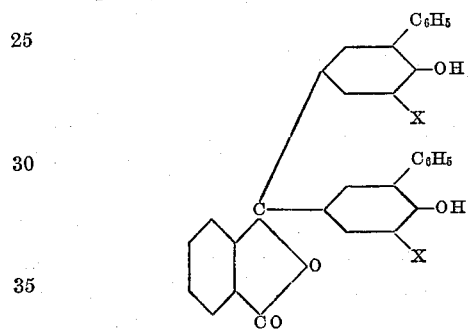

in which X is hydrogen, a halogen, nitro, amino, or an alkyl, said derivatives containing mercury in the position it occupies when solutions of said compounds in inert organic solvents are boiled with mercuric acetate and a small amount of glacial acetic acid.

4. The mono- and di-mercury derivatives of the compound represented by the formula:

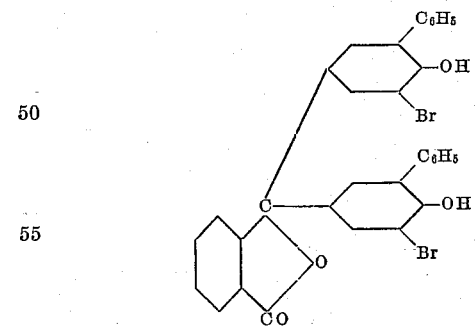

said derivatives containing mercury in the position it occupies when solutions of said compounds in an inert organic solvent are boiled with mercuric acetate and a small amount of glacial acetic acid.

5. The compounds having substantially the general formula:

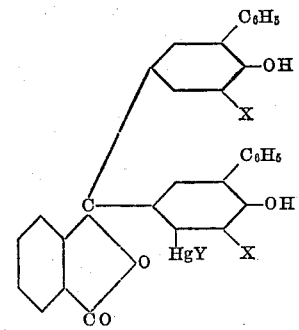

in which X is hydrogen, halogen, nitro, amino or alkyl and Y is hydroxyl, a halogen or acetyl.

6. The compounds having substantially the general formula:

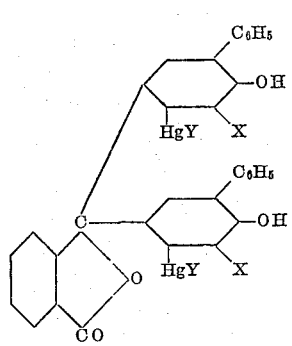

in which X is hydrogen, halogen, nitro, amino or alkyl and Y is hydroxyl, a halogen or acetyl.

7. Mono mercury derivatives of 3,3' di-phenyl 4,4' phenol phthalein, said derivatives containing mercury in the position it occupies when a solution in an inert organic solvent of the compound from which the mercury derivative is formed is boiled with mercuric acetate and a small amount of glacial acetic acid.

8. Di-mercury derivatives of 3,3' di-phenyl 4,4' phenol phthalein, said derivatives containing mercury in the position it occupies when a solution in an inert organic solvent of the compound from which the mercury derivative is formed is boiled with mercuric acetate and a small amount of glacial acetic acid.

SIDNEY E. HARRIS.
WALTER G. CHRISTIANSEN.